United States Patent [19]

Reinecke

[11] 4,238,955

[45] Dec. 16, 1980

[54] TIRE-PRESSURE MONITORING DEVICE

[75] Inventor: Erich Reinecke, Burgdorf, Fed. Rep. of Germany

[73] Assignee: WABCO Fahrzeugbremsen GmbH, Hanover, Fed. Rep. of Germany

[21] Appl. No.: 16,767

[22] Filed: Mar. 2, 1979

[30] Foreign Application Priority Data

Mar. 25, 1978 [DE] Fed. Rep. of Germany ....... 2813058

[51] Int. Cl.³ .............................................. B60C 23/02
[52] U.S. Cl. ...................................... 73/146.5; 340/58
[58] Field of Search ................. 73/146.5, 146.2, 146.3, 73/146.4; 340/58

[56] References Cited

U.S. PATENT DOCUMENTS

| 3,130,805 | 4/1964 | Carter et al. | 340/58 UX |
| 3,691,524 | 9/1972 | Frost et al. | 73/146.5 X |
| 3,977,355 | 8/1976 | Lorenz et al. | 73/146.5 X |
| 4,119,944 | 10/1978 | Smith | 73/146.5 X |
| 4,163,208 | 7/1979 | Merz | 73/146.5 X |

Primary Examiner—Jerry W. Myracle
Attorney, Agent, or Firm—R. S. Visk; R. W. McIntire, Jr.

[57] ABSTRACT

Tire-pressure monitoring apparatus for use with either single or dual tires for signaling deterioration of tire pressure by connecting tire pressure, upon actuation of a valve device by such reduced pressure, to a cylinder device which, in turn, moves a pin member into a space between two adjacent teeth of a rotatable member affixed to the tire, rotatable therewith, and having a plurality of teeth peripherally arranged thereon and alternately interspersed with equal spaces, except one, therebetween. Under normal conditions, the rotating member generates a magnetic field in the proximity of a sensing device which cooperates with the magnetic field for transmitting a series of signals of equal magnitude. If the magnetic field is interrupted by movement of the pin into the spaces, the sensing device transmits either control signals to an anti-skid device or tire-pressure indicating signals to a display panel, depending upon the magnitude of the signals.

5 Claims, 6 Drawing Figures

TIRE-PRESSURE MONITORING DEVICE

BACKGROUND OF THE INVENTION

The invention concerns a tire-pressure monitoring device. The present state of the art discloses mechanical sensing devices that emit a signal on collapse of a tire. However, such devices have the disadvantage that they are very susceptible to external disturbances, give a warning only when the tire pressure has already dropped to very low critical values, and cannot be employed with dual tires since there is no collapse in the case of failure of one tire because the second tire then takes over the entire load.

SUMMARY OF THE INVENTION

The object of the present invention, therefore, is to provide a tire-pressure monitoring device in which the above-described disadvantages of the known devices are eliminated and, in particular, a pressure decrease is timely and safely indicated even in the case of dual tires, and the susceptibility to external disturbance is reduced.

By means of the invention a change in tire pressure is determined directly and immediately and converted into a change, preferably, of an electrical magnitude. The change in the electrical magnitude can be, for example, a change of voltage, a change of electrical resistance, or a change in a magnetic field, that can be determined, for example, with the aid of an inductive sensor or field plate sensor. The field plate sensor has the further advantage that no rotating parts are required for obtaining a measurement signal.

DESCRIPTION AND OPERATION

Figure 1:
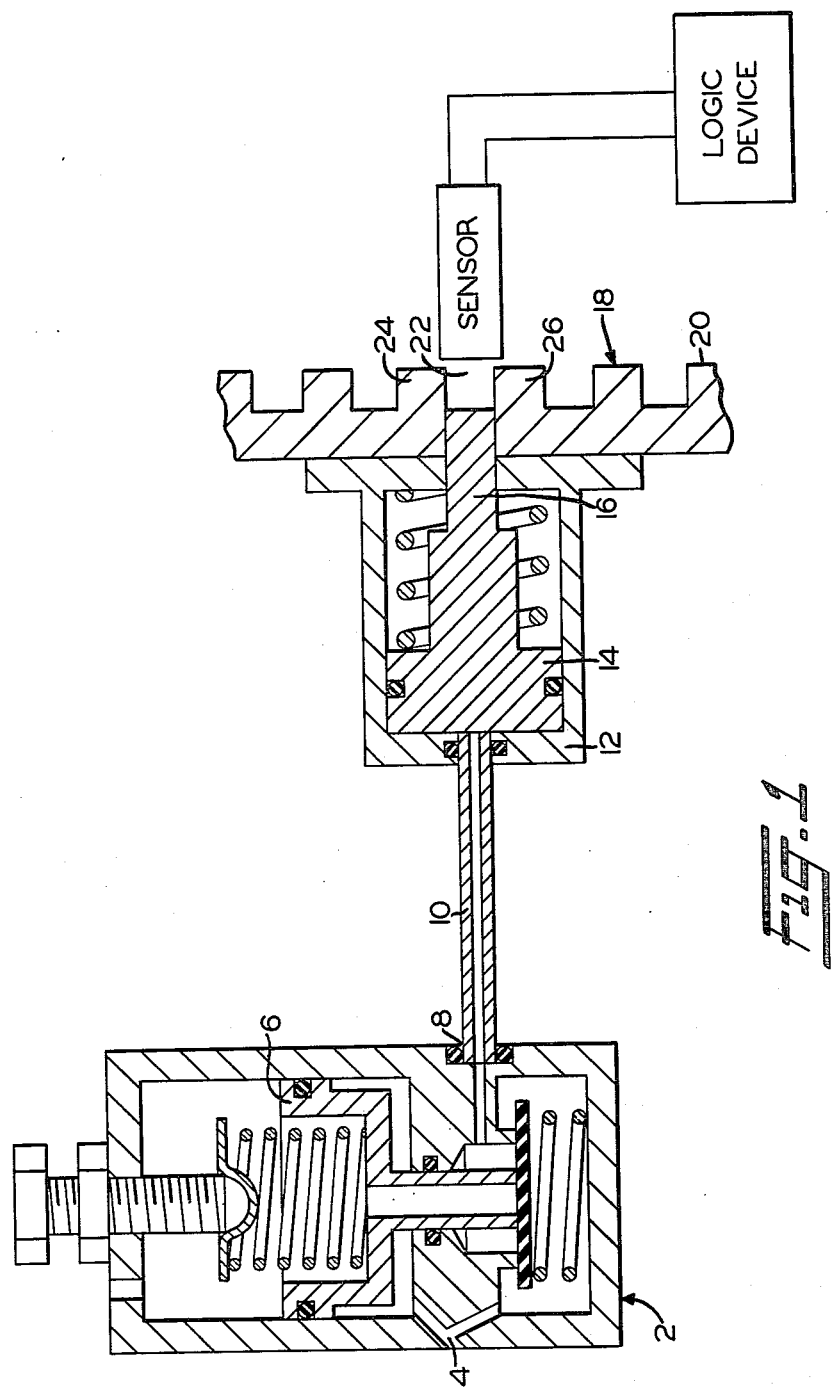
FIG. 1 shows a diagrammatic view, mostly in section of a tire-pressure monitoring device according to the invention.

In FIG. 1 the overall device according to the invention is represented schematically. A pressure valve device 2, that is arranged on the hub of the wheel or the rim is connected to one tire (not shown) via a line. The tire pressure acts, via an inlet connection 4, on a valve piston 6 of valve device 2. An outlet port 8 of valve device 2 is connected via a line 10 with a cylinder device 12, in which a piston 14 is operably arranged. The piston 14 is provided and axially movable with a pin 16, which can be in the form of an axial extension on one end of the piston, for example. The pin 16 cooperates with a rotation sensor 18 that senses a toothed wheel 20 rotating with the vehicle wheel. The pin 16 is axially reciprocably movable in a gap 22 between two adjacent teeth 24, 26 of the toothed wheel, where the gap in the teeth is filled by said pin as extensively as possible.

The manner of operation of the device according to FIG. 1 is essentially as follows. If tire pressure falls below a certain value, piston 6 of valve device 2 moves downwardly to open the valve whereby directing tire pressure into the cylinder device 12. In response to the pressure impulse, piston 14 is axially moved, which in turn moves the pin 16 into the gap 22 in the toothed wheel 20. A rotation sensor (designated symbolically in FIG. 1 as SENSOR), sensing the toothed wheel, emits a temporally extended signal correspondingly, which is recognized by a logic electronics device (designated symbolically in the drawing as LOGIC DEVICE) as a very great delay because of the 50% reduction in velocity. This delay value is greater than that that could arise in overbraking of the wheel because of the wheel delay that would then appear.

Detailed modified components corresponding to those of the device shown in FIG. 1 are represented in FIGS. 2 to 6, to which reference should now be made.

Figure 2:
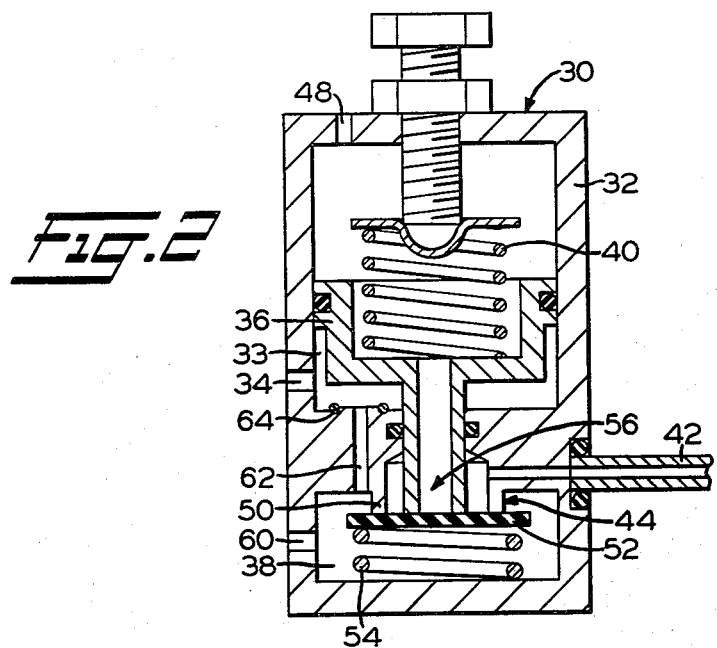
FIGS. 2 through 5 show various components and details of the tire-pressure monitoring device according to FIG. 1.

FIG. 2 shows dual tire pressure valve device 30 for use with dual tires but being also usable with single tires. The valve device 30 shown in FIG. 2 is rigidly connected by a housing 32 to a rotating part of the wheel, for example, the hub or rim. If only one tire is present then the pressure of the tire acts in a pressure chamber 33, via a port 34, on the piston surface of a hollow piston 36 of the valve and simultaneously enters a valve chamber 38. In response to such pressure, piston 36 is moved upwardly against the force of a spring 40 until an exhaust line 42 is connected with atmosphere via a ventilation valve 44 and an atmospheric port 48. The ventilation valve is formed by a valve seat 50 formed on the piston 36 and a valve element 52 that is tensioned toward a closed position on said valve seat by a spring 54. If the pressure in chamber 33 drops below a certain pressure (warning pressure) because of a decrease in the tire pressure, then under the force of spring 40 piston 36 is moved downwardly for opening ventilation valve 44 of valve device 30, whence line 42 leading to cylinder device 12 is ventilated. The ventilation valve 44, as above noted, is formed by valve seat 50 formed on the valve body 32, and the valve element 52, which thus acts as a dual function valve element. Obviously, according to the pressure an inversion of the function is possible as well.

If there is a dual tire situation, then the one tire is connected via connection 34 to the valve chamber 33 and the other tire is connected via a further connection 60 to the valve chamber 38. The valve chambers 33 and 38 are connected via a passageway 62. The channel 62 can be blocked by engagement of piston 36 with a ring seal 64.

In case of a leak in one of the two tires the pressure in valve chambers 33 and 38 falls simultaneously until the ventilation valve 50 opens. By means of the connection of the two tires via connection 34, passageway 62, and connection 60 the pressures continue to fall together until the lower surface of piston 36 makes sealing contact with sealing ring 62 thereby closing off the connection between chamber 33 and chamber 38. This operation ensures that the intact tire does not become depressurized.

Now in case the defective tire is connected via connection 60 with chamber 38, the pressure in line 42 again drops, whence the indication of the tire defect will also be deenergized. However, in order that an appropriate indication continue to be given by the device according to the invention, provision is made for an appropriate memory circuit in the electronics, which stores the defect information once it has been recognized and takes care of further indication of the defect.

Figure 3:
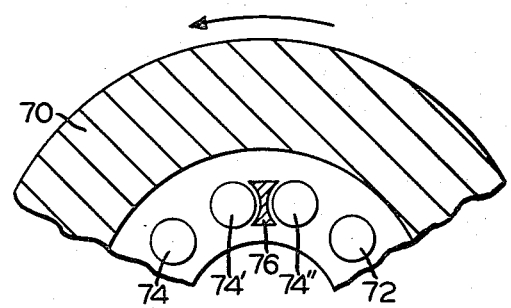
Figure 4:
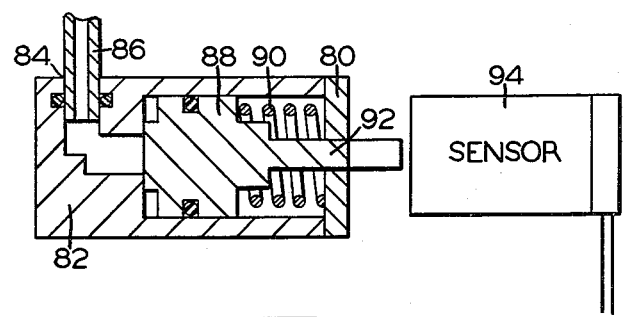

Reference should now be made to FIGS. 3 and 4.

In FIG. 3, a wheel hub 70 is shown in section and, radially internal, a toothed wheel 72 with teeth 74. The reference number 76 designates a surface region between two teeth 74' and 74" that can be occupied by pin 16 described in FIG. 1.

FIG. 4 shows a modified version of the cylinder-piston arrangement 12, 14 shown in FIG. 1. A toothed wheel 80 has a cylinder 82 associated therewith. Cylinder 82 is connected via a port 84 and a line 86 with the connection 42 of the valve device 30 according to FIG. 2. If pressure is introduced via connection line 86 and connection 84, then a piston 88 is acted upon by pressure and moves against the force of a spring 90 toward the right. A pin 92 is axially formed on one end of piston 88 in such a way that with movement of the piston 88 toward the right the tooth-gap of the toothed wheel is approximately completely filled, as is represented schematically in FIG. 3. If the piston 88 has travelled to the right in this manner, a sensor 94 (shown symbolically in the drawing) can, for example, no longer distinguish the teeth 74' and 74" of FIG. 3; that is, in the transition from tooth 74' to tooth 74" no signal is emitted by the sensor 94. For the electronic logic device this means a velocity reduction of 50%. Since this velocity change takes place from one tooth to the next, a high delay value results that is recognized by the electronic sequencing circuit (not shown in FIG. 4 but in FIG. 6) and indicates a tire defect.

Figure 5:
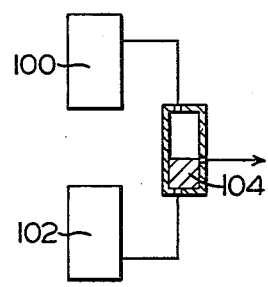

Reference should now be made to FIG. 5, which as an alternative to the invention according to FIG. 2, schematically shows how the dual tire valve device 30 of FIG. 2 can be replaced by two single valve devices 100 and 102 and a double-check or selector valve 104. The individual valves 100 and 102 are each assigned to one of the dual tires. The respective outlets of the single valves 100 and 102 are connected to respective inlets of the selector valve 104 and the outlet of said selector valve may be connected to the inlet of either the cylinder-piston arrangement of FIG. 1 or FIG. 4. The single valves 100 and 102 according to FIG. 5 differ from the valve device 30 of FIG. 2 in that the connection 60 is omitted. In a simple manner the selector valve 104 ensures that only the defective tire in any given case becomes active below the above-defined warning pressure and prevents a simultaneous ventilation of the other tire to the warning pressure as in FIG. 2. Further, one may dispense with memory device for storing information relating to the defective tire as described in connection with FIG. 2. The single valves 100 and 102 and the selector valve 104 can also be combined into one unit. Further, it may be advantageous to connect valve 100 with valve 102 in a manner similar to chambers 33 and 38 as done in valve device 30 of FIG. 2 so that a connecting passage between valves could be closed as passageway 62 may be closed in said valve device 30 according to FIG. 2.

Figure 6:
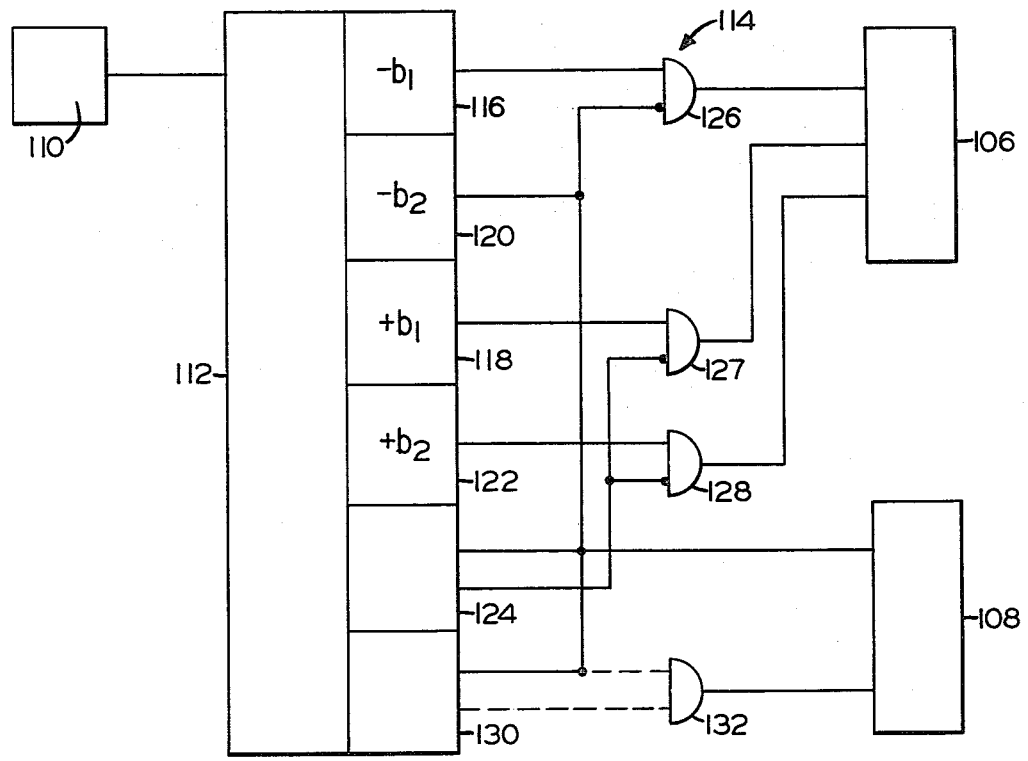
FIG. 6 shows a circuit design for effecting electrical signals indicating a tire defect, and for connecting to and actuating an anti-skid vehicle brake installation.

FIG. 6 represents a schematic diagram of an electronic control circuit for recognizing tire-defect signals that have already been described above. The circuit essentially corresponds to a conventional electronic anti-skid control system which is normally employed to prevent lockup of the vehicle brakes. However, the circuit, in addition to an anti-skid portion 106, also includes electronic components which recognize certain signals that are produced by the responding tire-pressure monitoring device and function to divert these signals away from the actual anti-skid control portion 106, and cause these certain signals to be conveyed to a tire-defect display panel 108.

As shown, a suitable sensor device 110 produces a series of periodic signals which are fed to an input circuit 112. Input circuit 112 is connected to a logic control circuit 114 which was inferentially mentioned above. The logic circuit 114 includes differentiators 116 and 118 for accommodating the deceleration and acceleration signals ($-b_1$ and $+b_1$) which are conventionally developed in controlled braking in anti-skid control circuits. It will be seen that two other differentiators 120 and 122 are also included in the logic circuit 114. The differentiator 120 is used for recognition of high deceleration signals ($-b_2$) as detected by the tire-pressure monitoring device according to the invention by means of the bridging of one or more gaps of the toothed wheel in the sensor device. The differentiator 122 is used for recognition of high acceleration signals as detected by the tire-pressure monitoring device according to the invention in the transition from two bridged teeth to the following gap ($+b_2$). Further, there is provided a timing device 124 for the blocking of the $+b_1$ and $+b_2$ signals to the anti-skid electronic circuit 106 after the occurrence of a $-b_2$ signal.

With the appearance of the $-b_2$ signal, the differentiator 116 will cause the production of a $-b_1$ signal which signifies an error signal for the anti-skid electronics circuit. As shown an AND-gate 126 is employed for blocking the $-b_1$ signal. In practice, the AND-gate 126 combines the $-b_1$ signal with the negated $-b_2$ signal. It will be noted that the output of the AND-gate 126 is fed to the anti-skid control electronic circuit 106.

If a $-b_2$ signal appears, then there is subsequently developed a $+b_2$ signal by the differentiator 122. Simultaneously, the differentiator 118 responds and produces the $+b_1$ signal. In this case the $+b_1$ signal for the anti-skid control electronic circuit 106 must be blocked since it represents an error signal.

The blocking action is accomplished by a switch-off delayed timing element 124 which is started by the $-b_2$ signal. The output signal from timing element 124 is fed to a negated input of a first AND-gate 127 and also to negated input of a second AND-gate 128. The output of the differentiator 118 for the $+b_1$ signals is applied to the other input of AND-gate 127, while the output of the differentiator 122 for the $+b_2$ signals is applied to the input of AND-gate 128. The outputs of the AND-gates 127 and 128 are connected to the anti-skid control electronic circuit 106. The timing element 124 is designed so that the AND-gates 127 and 128 are effective as long as the $+b_1$ and $+b_2$ signals are present so that the next sensor signal is also blocked, and thereafter, the output of the element 124 decays.

As shown in FIG. 6, a second timing element 130 is employed to provide additional security against an erroneous response of the tire-pressure monitoring device. The timing element 130 may take the form of a counter which is set by the $-b_2$ signal and is pulsed by the sensor signals. The counter 130 emits an output signal after one wheel rotation that is combined with the output signal of the $-b_2$ differentiator 120 in an AND-gate 132. The output signal of AND-gate 132 causes a response by the error display panel 108 of the tire-pressure monitoring device.

It will be appreciated that it is possible to replace the timing element 124 by a differentiator having a switching threshold which corresponds to the above-mentioned 50% velocity discontinuity produced by the response of the tire-pressure monitoring device. The output signal of such a differentiator would then block the $+b_1$ and $+b_2$ signals via the AND-gates 127 and 128.

The circuit may be designed in such a way that if a $-b_1$ signal is already present, and a $-b_2$ signal appears, any further control signals are blocked, but the $-b_1$ signal is maintained in order to prevent the vehicle wheel from locking up.

The use of a tire-pressure defect recognition arrangement in combination with the anti-skid control electronic circuit is not detrimental even during a controlled braking operation since blockage of the control signals only takes place for the duration of two sensor impulses.

I claim:

1. Pneumatic tire-pressure monitoring apparatus for use with vehicles also equipped with an anti-skid device operable responsively to brake control pulses resulting from variations of angular velocity of the wheel for preventing lock-up of the wheel during braking operations, said tire-pressure monitoring apparatus comprising:
   (a) a display panel operable responsively to variations of actuating pulses for indicating tire-pressure deterioration;
   (b) an annular toothed member concentrically rotatable with the tire and having a plurality of equiangularly arranged spaces peripherally formed thereon alternately between equi-angularly spaced teeth, all of said spaces, except one, being of equal dimension, said toothed member being operable for generating a magnetic field during rotation;
   (c) a sliding pin member operably disposed in said one space between two adjacent ones of said teeth and normally occupying a normal position in which the dimension of said one space is maintained identical to that of the other spaces;
   (d) a sensing device deployed in the proximity of said magnetic field and cooperating therewith for generating a series of tire-pressure indicating pulses of equal magnitude when said pin is in its said normal position, and being operable responsively to an irregular pattern of said magnetic field effected when said pin is slidably moved in said space out of its said normal position for producing a series of tire-pressure indicating pulses of irregular magnitude;
   (e) a control circuit connected to said sensing device for receiving both said brake control and tire-pressure indicating pulses and being operable for directing said brake control pulses to the anti-skid device when said tire-pressure indicating pulses are of equal magnitude, and for blocking out said brake control pulses, upon occurrence of said tire-pressure indicating pulses of irregular magnitude, and diverting said tire-pressure indicating pulses of irregular magnitude to said display panel; and
   (f) means connected to the tire-pressure and operable responsively to a reduction of such pressure of a certain degree or more for effecting movement of said pin in said one space.

2. Pneumatic tire-pressure monitoring apparatus, as set forth in claim 1, wherein the teeth of said plurality of teeth extend axially from the side of the member adjacent the sensing device.

3. Pneumatic tire-pressure monitoring apparatus, as set forth in claim 1, wherein the last said means comprises:
   (a) a cylinder device including a piston on which said pin is carried and effective when subjected to tire pressure for moving said pin out of its said normal position into said one space; and
   (b) a valve device connected to the tire pressure and to said cylinder device, said valve device including a valve member urged by said tire pressure to a closed position in which such tire pressure is cut off from said cylinder device, and being operable, upon reduction of said tire pressure, to an open position in which said tire pressure is transmitted to said cylinder device.

4. Pneumatic tire-pressure monitoring apparatus, as set forth in claim 1, wherein said control circuit comprises:
   (a) respective differentiators for recognizing acceleration and deceleration control pulses at a rate less than and at a rate in excess than a certain rate;
   (b) respective timing means actuated upon occurrence of said acceleration or deceleration control pulses at a rate in excess of said certain rate and operable for transmitting said control pulses in excess of said certain rate to said anti-skid device; and
   (c) AND-gate means effective, upon reduction to or occurrence of said control pulses at a rate less than said certain rate, for blocking transmittal of the control signals to the anti-skid device and diverting them to said display panel.

5. Pneumatic tire-pressure monitoring apparatus, as set forth in claim 3, wherein said valve device is connectable to dual tires and is alternatively operable for connecting tire pressure from one or the other of said dual tires, depending upon which is losing pressure, to said cylinder device.

* * * * *